Feb. 5, 1952     B. F. DODGE     2,584,381
LOW-PRESSURE GASEOUS $O_2$ CYCLE WITH NO CHEMICAL AIR PURIFICATION
Filed May 16, 1947
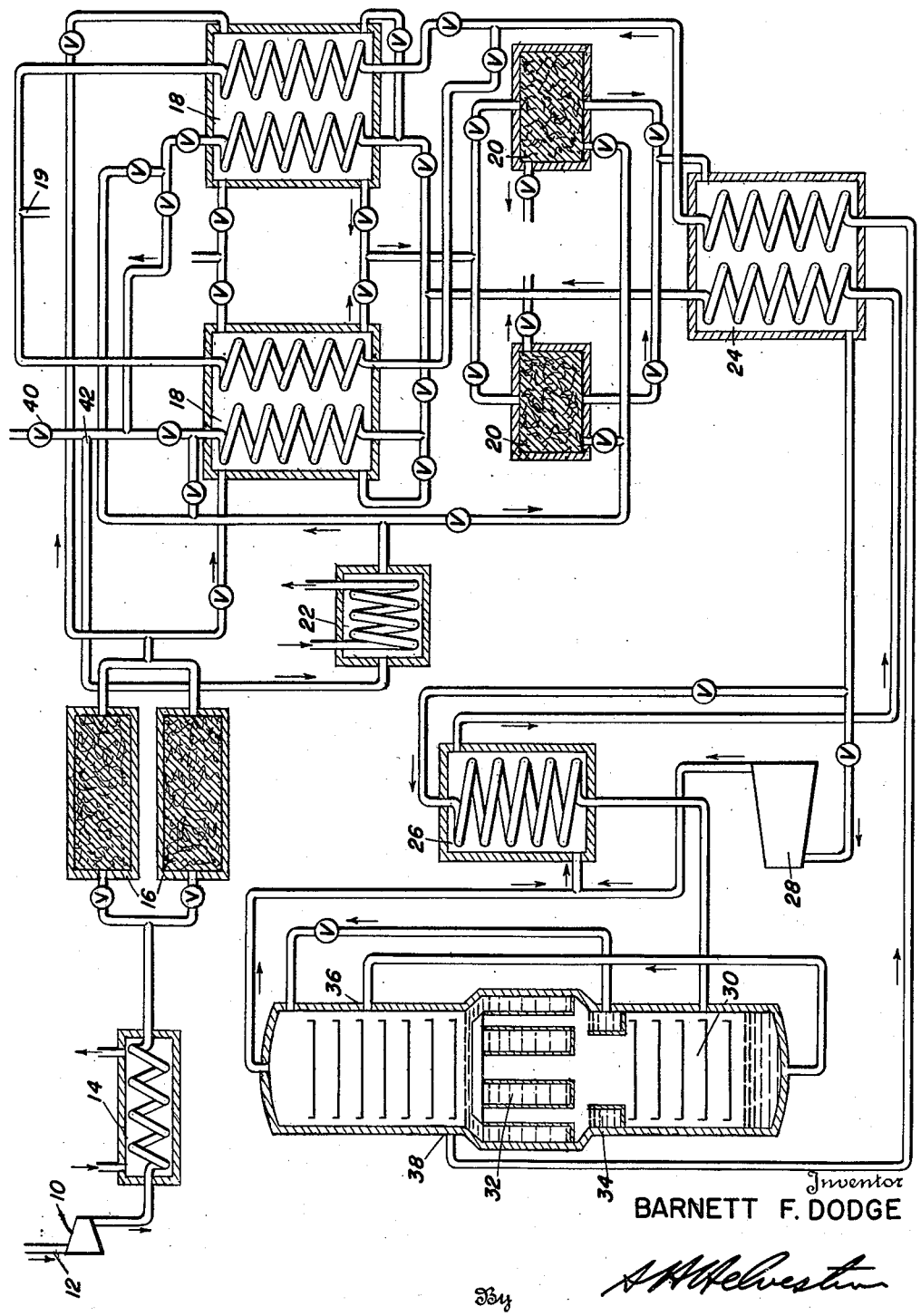
Inventor
BARNETT F. DODGE
By
Attorney Patented Feb. 5, 1952

2,584,381

UNITED STATES PATENT OFFICE 2,584,381

LOW-PRESSURE GASEOUS O₂ CYCLE WITH NO CHEMICAL AIR PURIFICATION

Barnett F. Dodge, Hamden, Conn., assignor to the United States of America as represented by the Secretary of the Navy Application May 16, 1947, Serial No. 748,619

1 Claim. (Cl. 62—175.5)

This invention relates to the low-pressure process of rectification of gaseous mixtures; and in particular to the process of purifying the said mixtures by the removal of moisture, carbon dioxide and other impurities therefrom prior to their entrance into the final heat exchanger.

The general object of the invention is to provide a process for the removal of these impurities in which chemical reagents or other materials which must be replaced when exhausted are not required.

An additional object of the invention is to provide a method for the removal of these impurities which is continuous in operation.

A further object is to provide a method for the continuous removal of these impurities which is based upon the physical properties of certain materials to absorb moisture and to adsorb carbon dioxide from the gas stream which materials are capable of regeneration or reactivation and can therefore be used for long periods of time.

A still further object of the invention is to provide a method for the complete removal of moisture from the gas stream by condensation and freezing.

It is also an object of this invention to provide a process for the rectification of gaseous mixtures which is economical and efficient in operation.

These and other objectives will be apparent from the following description and from the drawing which is a diagrammatic plan showing a preferred embodiment of the invention applied to the production of gaseous oxygen from air.

In the drawing air is taken into compressor 10 as at 12. This compressor may be of the turbine type. The air is compressed to a pressure in the range 4 to 30 atmospheres. The compressed air is cooled in the usual manner in "after-cooler" 14 and is partially dried in a standard system using alumina or silica gel as at 16. The compressed and partially dried air passes thence into one of a pair of switch exchangers 18 which operate at a temperature sufficiently low to condense and freeze out the moisture contained in the air. While the air is passing through the "on stream" exchanger the other is being thawed by returning nitrogen. The dried compressed air then enters one of a pair of adsorbers 20 which may be filled with active carbon, alumina gel, silica gel or similar adsorbent material. The temperature at entrance will vary with circumstance but should be in the range —40° F. to —240° F.

These adsorbers remove the carbon dioxide from the compressed air. While one is "on stream" the other one is "off" and is being stripped by a stream of nitrogen which has been heated by means of steam in a heater as shown at 22. This same nitrogen also thaws the switch exchangers and removes the water. The cycle for switching the exchangers and adsorbers will vary with circumstances. The period will be in the range of from 2 to 24 hours.

The air is somewhat heated in passing through the adsorbers and it is further cooled in an exchanger 24 by countercurrent heat exchange with oxygen and nitrogen leaving the rectifying column. This exchanger does not need to be switched as all of the impurities causing deposits have now been removed from the air.

The air leaving exchanger 24 is at about —240 to —270° F. It passes thence in part through liquefier 26 and in part through turbine expander 28 whence it passes as a refrigerant to the cooling side of liquefier 26. The air liquified in liquefier 26 drains into the bottom of rectifying column 30. Nitrogen being more volatile than the oxygen volatilizes from the liquid air in the base of the column into condenser 32 which is cooled by liquid oxygen. The nitrogen is liquefied and drains into annular pocket 34 from whence it is introduced into the top of the column to serve as rectifying liquid. Liquid air from the bottom of the column is introduced at an intermediate point 36 into this column where it vaporizes and is rectified, the gaseous nitrogen passing out at the top of the column and the liquid oxygen draining to the cooling side of condenser 32. This liquid oxygen vaporizes and the pure gaseous oxygen is withdrawn as at 38. It passes thence to the cooling side of exchanger 24 and thence to the cooling side of either one of switch exchangers 18 and thence is withdrawn as the gaseous oxygen product as at 19. The cold gaseous nitrogen withdrawn from the top of the rectifying column passes on the cooling side of the liquefier. Here it may be mixed with the expanded air from the turbine expander 28. Nitrogen or the mixture of nitrogen and air pass thence to the cooling side of exchanger 24, thence to the cooling side of either one of switch exchangers 18 and thence out of the system as at 40. A part of this nitrogen may be taken as at 42 to be heated in steam heater 22 and used for thawing and absorbing purposes as above described. In both cases the nitrogen is discharged to the atmosphere since in the one case it contains moisture and in the other carbon dioxide or other hydrocarbon.

An important advantage of the use of adsorbers is that they will also remove acetylene and related hydrocarbons as well as carbon dioxide from the air stream. This is very important because such hydrocarbons constitute an explosion hazard in the operation of low temperature gaseous oxygen processes. Also this method of carbon dioxide removal has advantages over both the chemical method of removal and the purely mechanical method of freezing out the carbon dioxide. The advantages over the chemical method are that no materials are expended and the process is cleaner and more convenient. The chief advantage over freezing out is that the carbon dioxide is definitely localized and strongly attached to a surface so that there is no plugging of lines or fouling of heat transfer surfaces.

Reference is herbey made to the copending joint application Number 748,620, filed May 16, 1947, now abandoned, for Oxygen Production, wherein no particular method of purification of the air is disclosed but the method of purification herein described could be used in the method disclosed in that application.

But the scope of this invention is by no means limited to this particular cycle. It can be used with practically any low temperature liquefication or gas separation cycle whether operating on air or other gases such as natural gas, coke oven gas, petroleum cracking gases and the like. In all of these applications the manner of use does not depart materially from that above described and is included within the spirit and scope of the invention to the extent defined by the herewith appended claim.

What is claimed is:

The process of low-pressure and low-temperature rectification of gaseous mixtures of at least two components comprising compressing the gaseous mixture to a relatively low absolute pressure, cooling the compressed mixture to remove the heat of compression, removing the condensed moisture from the gaseous mixture by passing it through one of a pair of dryers provided with a water absorbent material, passing the partially dried gaseous mixture through one of a pair of switch exchangers to condense and freeze out the remaining moisture, passing the dried gaseous mixture through one of a pair of adsorbers provided with an adsorbing medium to remove carbon dioxide and other hydrocarbons therefrom, passing the thus purified gas through a second heat exchanger to reduce its temperature to the range of −240 to −270° F., passing one part of the pure, cold, compressed gas through a liquefier and the other part through an expander engine to act as a refrigerant in the liquefier, passing the liquefied gas into the base of a rectifying column where the more volatile component of the liquefied gas volatilizes, enters a condenser positioned intermediately of two sections of the column and is condensed therein to a liquid, throttling this liquid into the top of the column to vaporize and act as a rectifying liquid therein, passing the liquefied gas from the bottom of the column into the column at a point intermediate to the condenser and the top of the column wherein the remainder of the more volatile component volatilizes and passes to the top of the column and the less volatile component passes as a liquid into the cooling side of the condenser, withdrawing as a gas the rectified, more volatile component from the top of the column, passing it as a refrigerant into the cooling side of the liquefier, passing it thence as a refrigerant into the cooling side of the second heat exchanger, thence as a refrigerant on the cooling side of the "on stream" switch exchanger and thence in part to the atmosphere and in part through a heater whence it is introduced in part into the "off stream" adsorber to reactivate the adsorbing medium therein and to remove the adsorbed carbon dioxide and other hydrocarbons therefrom and venting this reactivating gas to the atmosphere, passing the other part of the heated gas through the cooling side of the "off stream" switch exchanger to melt the ice formed exteriorly thereof and thence to the cooled side of this switch exchanger to evaporate the water formed by the melted ice and thence discharging this moisture laden gas to the atmosphere, withdrawing the rectified, gaseous, less volatile component from the column at a point immediately above the refrigerating liquid in the condenser, passing this gas as a refrigerant through the second heat exchanger, thence as a refrigerant into the cooling side of the "on stream" switch exchanger and discharging this gas thence as the gaseous product of the process.

BARNETT F. DODGE.

REFERENCES CITED

The following references are of record in the file of this patent:

UNITED STATES PATENTS

| Number | Name | Date |
| --- | --- | --- |
| 2,113,680 | De Baufre | Apr. 12, 1938 |
| 2,337,474 | Kornemann et al. | Dec. 21, 1947 |
| 2,503,939 | De Baufre | Apr. 11, 1950 |